Jan. 5, 1965  M. B. McCULLAGH  3,164,238
CONTINUOUS CONVEYORS
Filed June 11, 1962  5 Sheets-Sheet 5
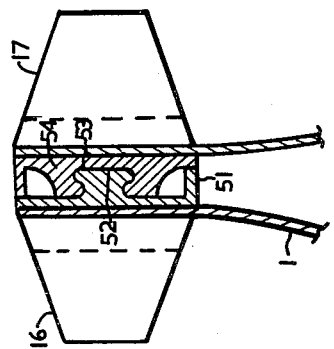
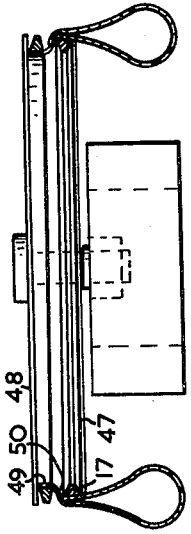
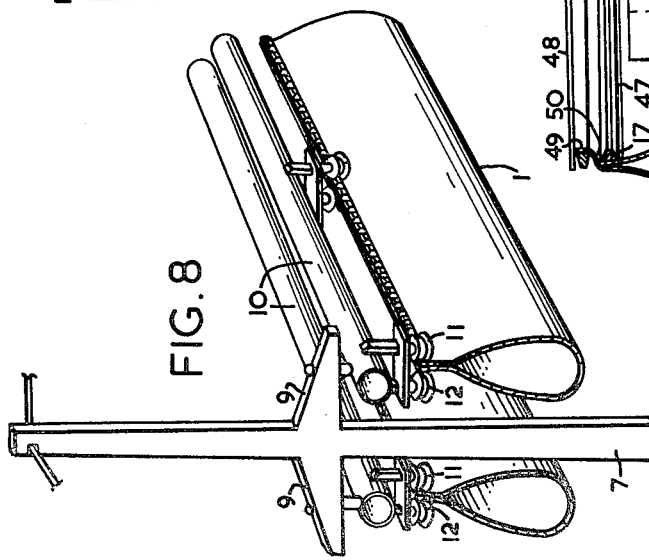
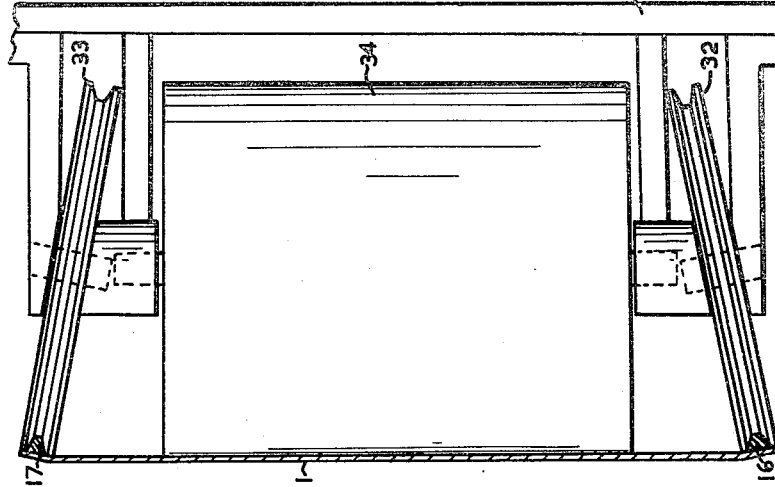

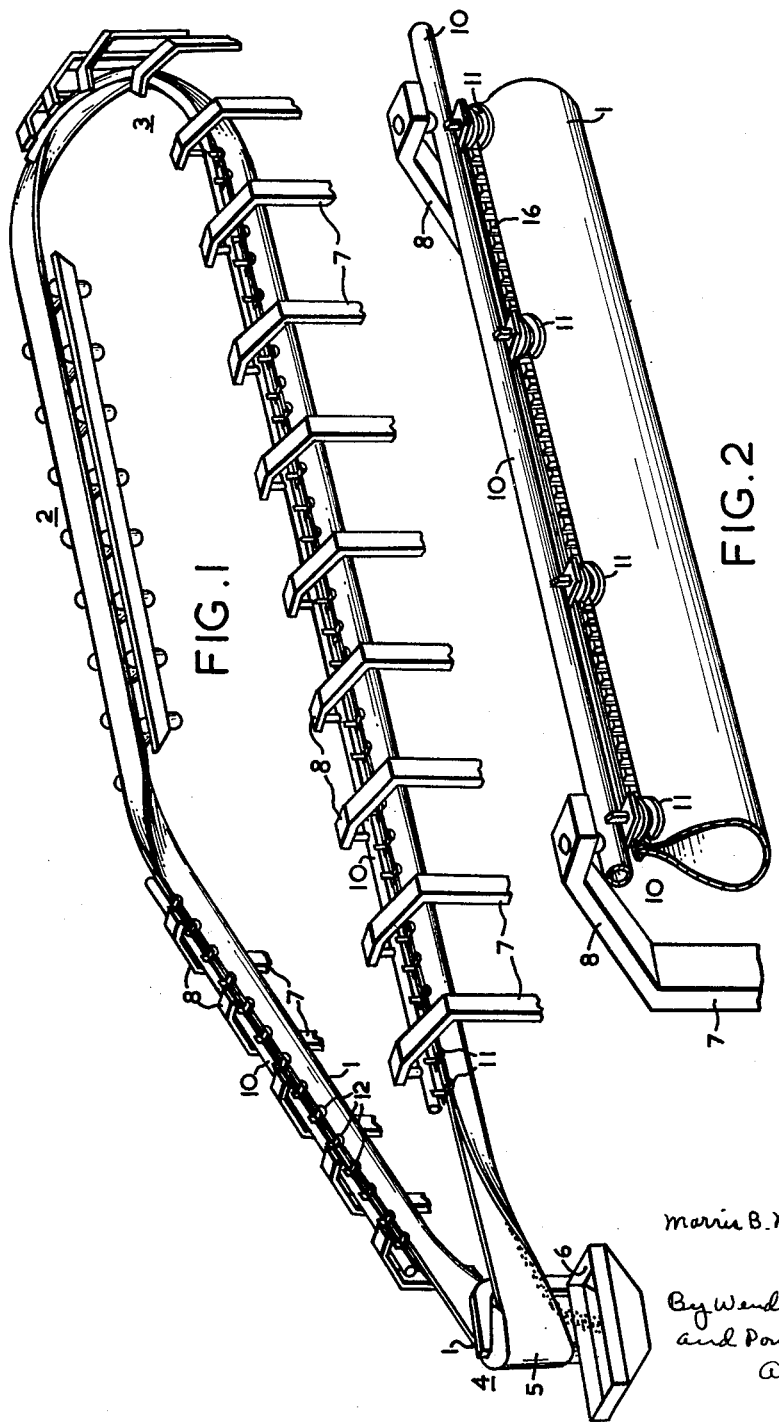

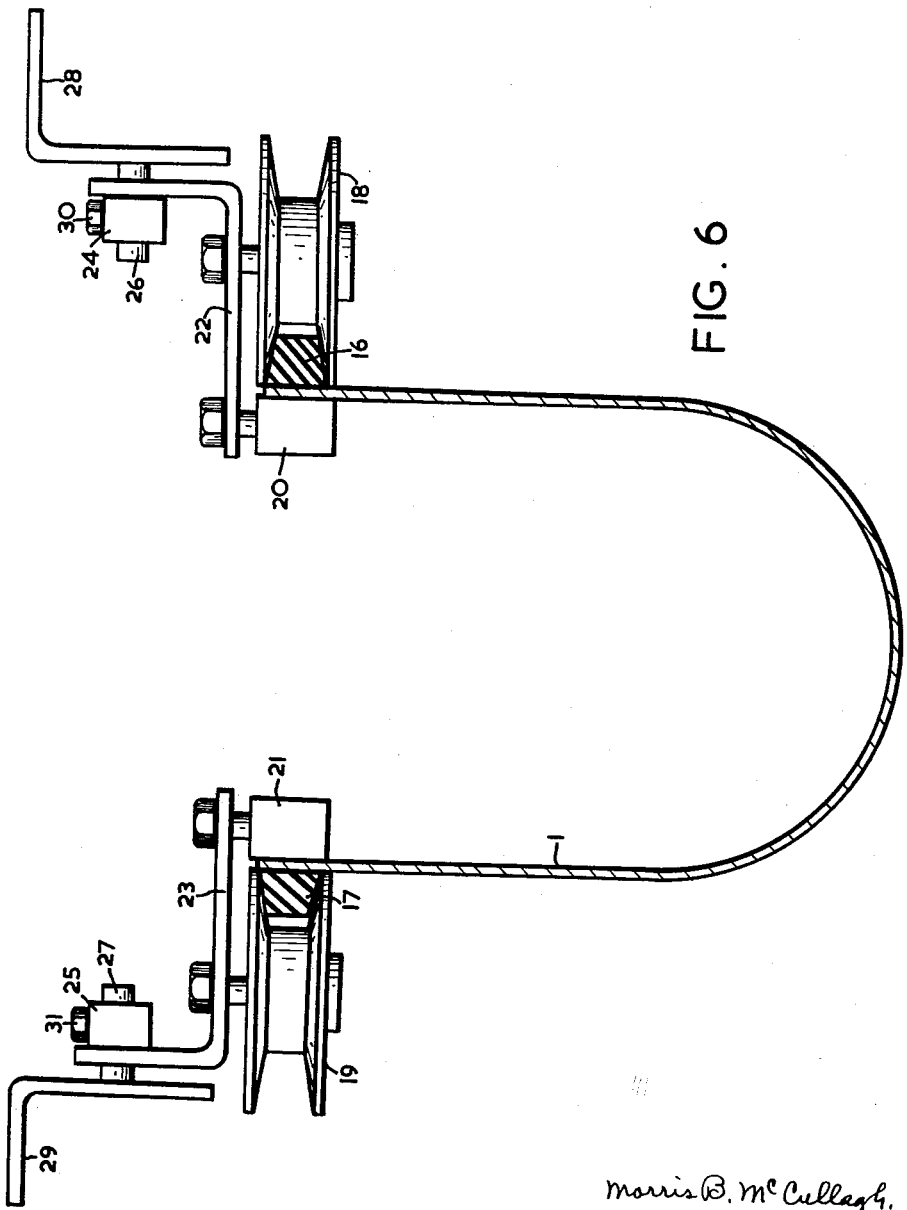

United States Patent Office 3,164,238
Patented Jan. 5, 1965

3,164,238
CONTINUOUS CONVEYORS
Morris Behan McCullagh, 23 Wallaroy Road,
Double Bay, New South Wales, Australia
Filed June 11, 1962, Ser. No. 201,549
Claims priority, application Australia, June 16, 1961,
5,900/61
4 Claims. (Cl. 198—19)

This invention relates to continuous conveyors.

The object of this invention is to provide a conveyor which is particularly suited for the conveyance of cement and other particulate fine-grained materials.

According to this invention a continuous conveyor comprises a continuous belt, teeth formed in the edges of the under surface of the belt, means for bringing the edges of the belt together after loading so as to form a tubular conveyor, and means at the discharge station to cause the belt to assume the opened state. Preferably the underside edges of the belt are formed as toothed racks, and the racks are driven at a number of spaced stations by any suitable means.

Reference will now be made to the accompanying drawings in which

FIGURE 1 is a general diagrammatic drawing of a conveyor according to this invention.

FIGURE 2 is an enlarged drawing of portion of the conveyor of FIGURE 1.

FIGURE 6 is a detail at a loading station.

FIGURE 7 is a detail at a discharge station.

FIGURE 8 shows portion of a conveyor having adjacent and parallel go and return paths.

FIGURE 9 is a detail of tail end return pulleys for the arrangement of FIGURE 8.

FIGURE 10 is a section through the top edges of a belt having interlocking edges.

Figure 4:
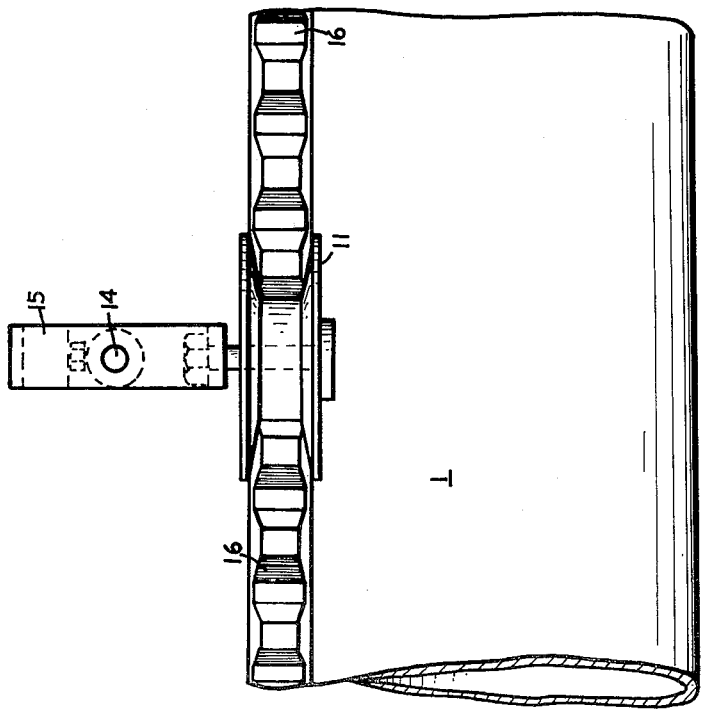
FIGURE 4 is a side view of the detail of FIGURE 3.

FIGURE 1 shows diagrammatically a return loop type conveyor in accordance with this invention, the conveyor belt being shown at 1, and the conveyor belt passing from a loading point 2 around the loop 3 to a discharge point 4 and thence back to the loading point 2. At the loading point the belt 1 may be opened to form a substantially flat surface or a shallow V or U, as shown, in which case it is supported in conventional manner by suitable rollers at this point, or it may be supported in the form of a deep U as is shown in FIGURE 6. As it passes from the loading station 2 the edges of the belt are brought together gradually to form a bag conveyor as may be seen in FIGURES 2 to 4, the conveyor being supported by its edges. At the discharge point 4 the bag conveyor is opened out again into a flat surface, but this time a vertical surface 5, which discharges into, say, a hopper 6.

Figure 3:
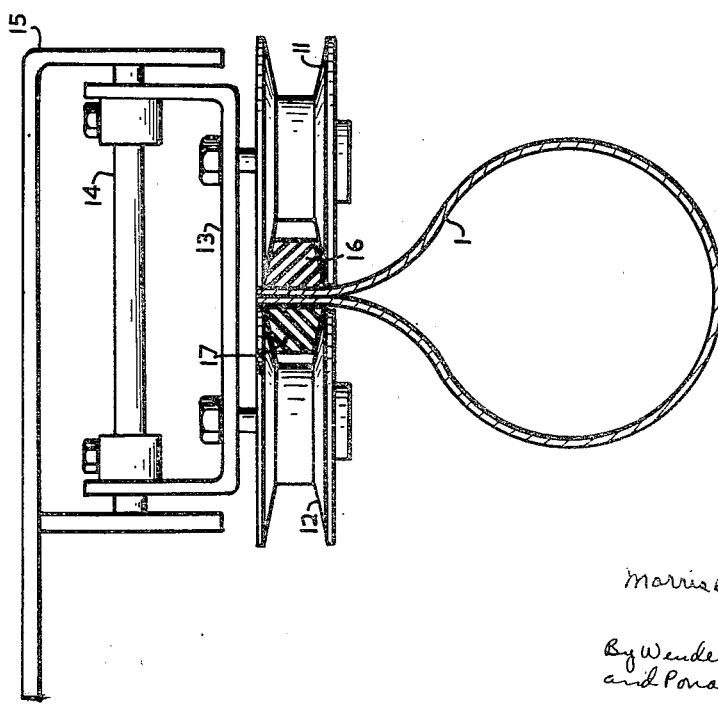
FIGURE 3 is a still further enlargement showing an end view of two V pulleys supporting the edge rack and bag.

The manner in which the conveyor bag is supported between the loading and discharge points is best seen from FIGURES 3, 4 and 8, taken in conjunction with FIGURE 1. The main supporting members are vertical posts 7, which may have an overhanging arm on one side as at 8 in FIGURE 1 or may be of T shape to give two overhanging arms, one on each side of the upright 7, as at 9 in FIGURE 8 when the go and return paths of the belt are parallel and closely adjacent. The overhanging arms are united by suspension rails 10 which may be tubular or of flat, S or T section. Opposed pair of V pulleys, 11, 12 are suspended from the rails 10 at suitable intervals by any suitable means. FIGURES 3 and 4 show the pulleys hung from a bracket 13 which is pivoted about an axle 14 secured to a further bracket 15 which is bolted to the suspension rails 10 (not shown in FIGURES 3 and 4). The adjacent edges of the pulleys 11, 12 are spaced apart by slightly more than twice the thickness of the body portion of the belt. The outside edges of the bag, as they appear in FIGURES 3 and 4, are thickened to provide a toothed rack: the thickening may be in the form of toothed V ropes 16, 17 secured to the edges of the belt by vulcanising, glueing, rivetting, etc., or may be moulded or formed integrally with the belt proper 1.

One configuration of the bag conveyor which is suitable for use at the loading station 2 is shown in FIGURE 6. Here the two edges are supported at a suitable distance apart go give a U configuration with vertical arms. In this case the edge racks 16, 17 and the portions of the belt to which they are attached are held between V pulleys 18, 19 and plain presser wheels 20, 21. The pulleys and presser wheels are hung from L-shaped brackets 22, 23 whose vertical arms carry bearings 24, 25 by which the brackets are carried on stub axles 26, 27 secured to inverted L-brackets 28, 29. The last mentioned brackets are secured to suitable suspension rails. The same arrangement may be used for the lead in from the closed position of the bag conveyor to the loading position, the brackets 22, 23 being locked on the stubs 26, 27 by locknuts 30, 31 at a suitable angle to give the desired lead-in.

A detail of a suitable arrangement at the discharge point is shown in FIGURE 7. Here the belt 1 is shown stretched out in a vertical plane over a drum 34 with the edge racks 16, 17 engaging in the V pulleys 32, 33 which are angled to give a suitable angle of lead to the edge racks. The pulleys 32, 33 and drum 34 are mounted in suitable bearings on a frame 35 which may be of mild steel.

Figure 5:
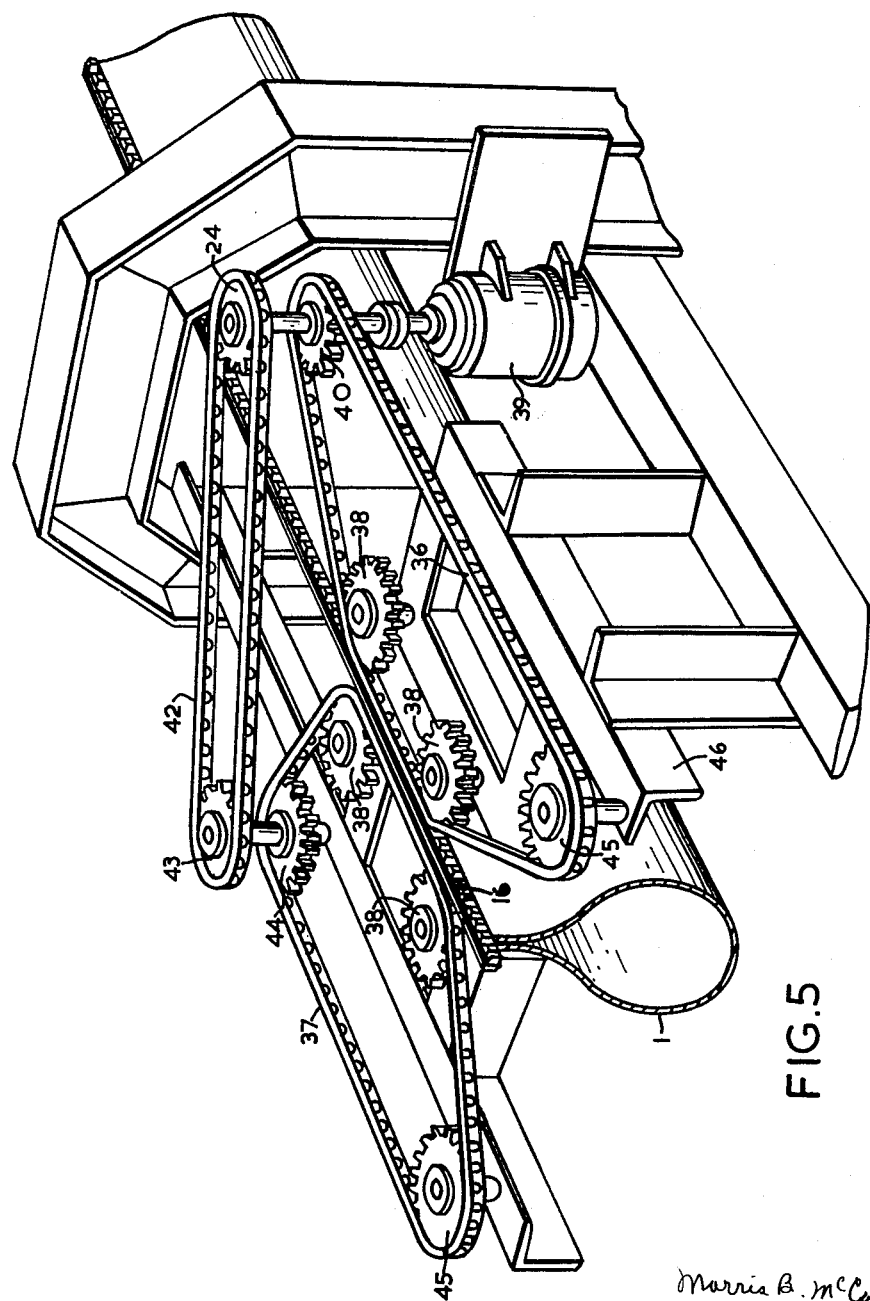
FIGURE 5 is a drawing of a drive arrangement for the conveyor, of which more than one may be provided.

The conveyor bag is driven by one, or preferably more, motors having drive means which engage with the edge racks 16, 17. The preferred arrangement at a driving station is shown in FIGURE 5, in which two endless toothed racks 36, 37 are provided, one on each side of the bag. As shown the racks 36, 37 are toothed on both sides and the teeth on the external side engage with the teeth in the edge racks 16, 17 so as to provide a driving engagement with them. The racks 36, 37 are held against the edge racks 16, 17 by idler sprocket wheels 38. An electric motor 39 drives a sprocket wheel 40 which engages with the inside teeth of rack 36, and drives rack 37 in a similar manner through a drive including sprocket 41, chain 42, and sprockets 43, 44. Sprockets 45 are idler sprockets secured to a frame 46 which carries the drive.

FIGURE 9 shows a detail of tail end pulleys 47, 48 which can be used where the bag conveyor returns parallel with itself as in FIGURE 8. One pulley 47 has a V groove to take the edge rack 17, while the other pulley 48 has a flat base 49 to take the flat side of the belt opposite edge rack 16. The base 49 has a tapered face 50.

In the preferred form of the invention the belt is driven at a number of independent spaced driving stations, a separate driving motor being provided at each station. As a consequence the belt length which may be used is practically unlimited, since the driving stations can be placed sufficiently close together to prevent any problems arising from stretch in the belt. Furthermore a number of standard and readily available electric motors may be used instead of a single very powerful motor at the end which must be individually designed for each installation.

While a particular form of drive has been shown in FIGURE 5, other forms may be used to engage the toothed rack, such as a driving chain having teeth for engaging with the rack, the chain passing around sprockets one of which is driven from the motor.

Alternatively the belt may be driven on one side only, the other marginal edge being non-toothed and held by plain grooved idler pulleys against the other toothed marginal edge.

A modified belt construction shown in FIGURE 10 is particularly useful where the upper edges of the belt should be held in tight engagement over the whole length of the run from loading to unloading stations. The belt is provided with strips of flexible material along its facing edges which will interlock with each other, as for example by having a strip 51 on one edge having a continuous stud like projection 52 which is receivable within a groove 53 in a strip 54 secured to the other facing edge. Other forms of interlocking edge strips may be used. The edges are separated at the loading and unloading stations by any suitable means, such as parting strips or edges.

While the conveyor belt has been described as a treated fabric belt, such as rubberised fabric belt, other flexible belts may be used, including nylon or other synthetic plastic belts. In some instances it is possible to use belts of thin sheet metal to the marginal edges of which rubber, rubberised fabric, nylon or other suitable toothed edging has been secured as by glueing, rivetting or bolting. For some materials, not in powder form, the belt may be of metal or nylon link construction, with suitable toothed flexible edging secured thereto.

What I claim is:

1. A continuous conveyor, comprising a continuous belt having the longitudinal edge portions of one surface thereof opposed to and in contact with each other for most of the length of the belt, teeth on the longitudinal edge portions of the other surface of the belt, a plurality of pairs of grooved pulley wheels mounted for rotation about vertical axes and having laterally opening grooves in the edges thereof opposed to each other, said pairs of pulley wheels being spaced along the length of said continuous belt and having the teeth on said belt engaged in said grooves in the pulley wheels for supporting the belt and the material being conveyed and guiding the edges of the belt, toothed drive means engaging the teeth on said belt at at least one point along the length of said belt for driving the belt, a loading station having means for spacing the opposed contacting edges of the belt and supporting the one surface so that it faces upwardly for receiving material to be conveyed, and a discharge station having means for spacing the opposed contacting edges of the belt and supporting one edge of the belt at a level lower than the other edge of the belt for discharging the material conveyed by the belt.

2. A continuous conveyor as claimed in claim 1 in which said teeth are in the form of a toothed rack extending along the edge portions of the said other surface of the belt.

3. A continuous conveyor as claimed in claim 1 in which there are a plurality of toothed drive means at spaced points along the length of the belt.

4. A continuous conveyor as claimed in claim 1 in which the continuous belt is curved in bag form in the cross sectional direction and the opposed edge portions of said one surface have interengaging members thereon for interlocking with each other.

References Cited by the Examiner

UNITED STATES PATENTS

| 2,108,488 | 2/38 | Johns | 198—201 |
| 2,825,442 | 3/58 | Carter | 198—165 |
| 3,015,381 | 6/62 | Mohwinkel | 198—165 |

SAMUEL F. COLEMAN, *Acting Primary Examiner.*
WILLIAM B. LA BORDE, *Examiner.*